(12) United States Patent
San Martin

(10) Patent No.: US 10,016,063 B2
(45) Date of Patent: Jul. 10, 2018

(54) BEDSIDE MATTRESS ELECTRONICS CADDY

(71) Applicant: Ricardo Tomas San Martin, Anna, TX (US)

(72) Inventor: Ricardo Tomas San Martin, Anna, TX (US)

( * ) Notice: Subject to any disclaimer, the term of this patent is extended or adjusted under 35 U.S.C. 154(b) by 224 days.

(21) Appl. No.: 14/969,155

(22) Filed: Dec. 15, 2015

(65) Prior Publication Data

US 2017/0164755 A1 Jun. 15, 2017

(51) Int. Cl.
*A47C 21/00* (2006.01)
*H02J 7/00* (2006.01)

(52) U.S. Cl.
CPC ............ *A47C 21/00* (2013.01); *H02J 7/0044* (2013.01); *H02J 7/0045* (2013.01)

(58) Field of Classification Search
CPC ...................................... A47C 21/00
USPC .................................. 5/503.1, 658
See application file for complete search history.

(56) References Cited

U.S. PATENT DOCUMENTS

| 4,831,673 A | * | 5/1989 | Winckler | A47C 21/00 248/241 |
| 7,494,102 B1 | * | 2/2009 | Deal | A61G 5/10 220/482 |

* cited by examiner

*Primary Examiner* — Fredrick C Conley
(74) *Attorney, Agent, or Firm* — Guy V. Manning, Esq.

(57) ABSTRACT

A bedside electronics caddy comprises a substantially vertical body, or trunk, juxtaposed to the side of the bed and coupled thereto a mounting head. Disposed on the vertical body opposite the bed, a resilient mandible extends upwardly from the bottom edge of the trunk to an outwardly curled lip, thereby forming an upwardly open pocket for holding an object such as a mobile electronic device. In one embodiment, the mounting head comprises a resilient hook which clamps onto the top of a bedside rail supporting the bed. In an alternate embodiment, the mounting head comprises a spur which inserts between the bed mattress and box spring, thereby cooperating with beds which have no side rails. In both alternate embodiments, an optional magnetic field generator mounted within the trunk may excite a charging coil within the chassis of the mobile electronic device for recharging the device.

21 Claims, 5 Drawing Sheets

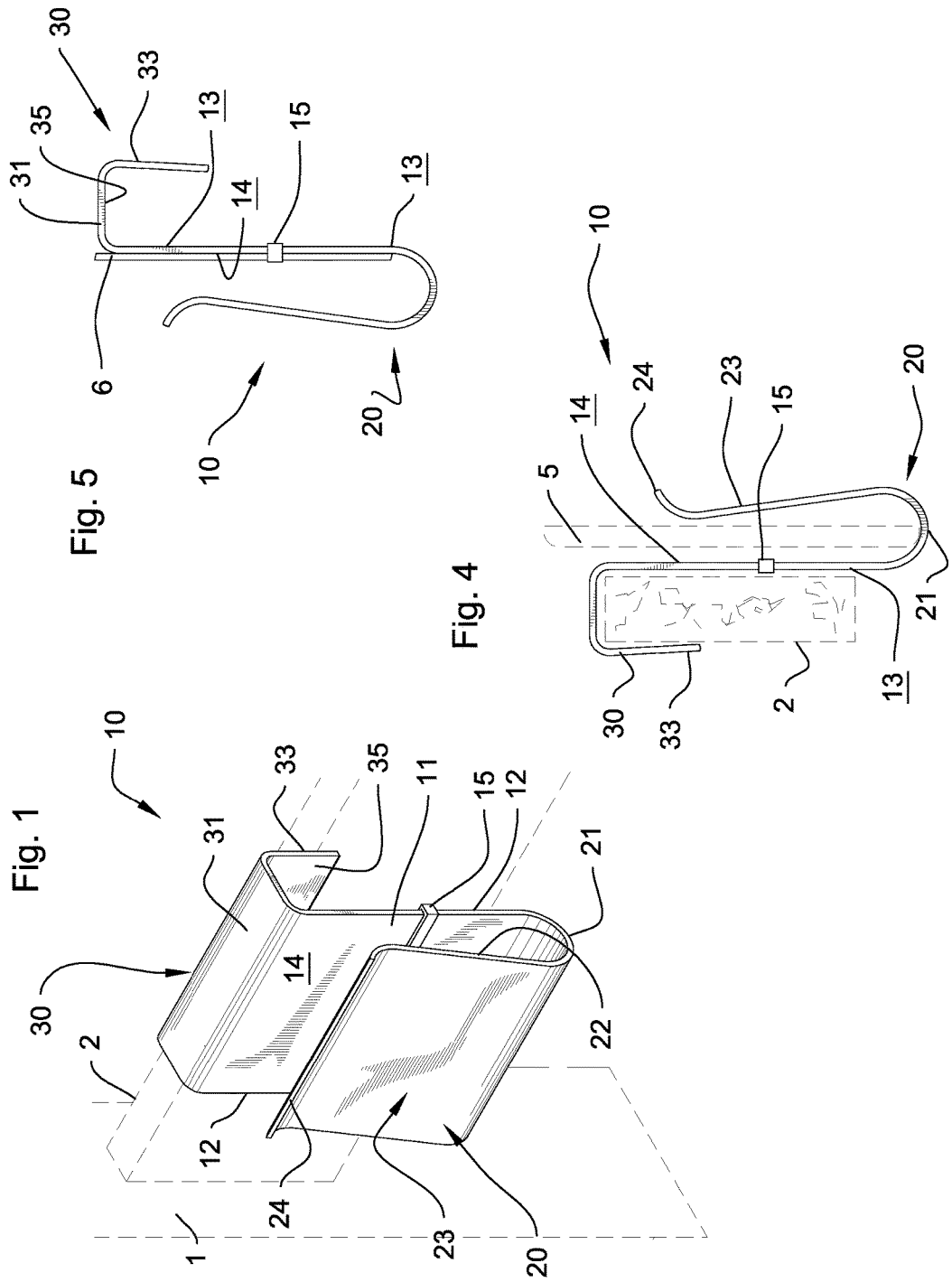

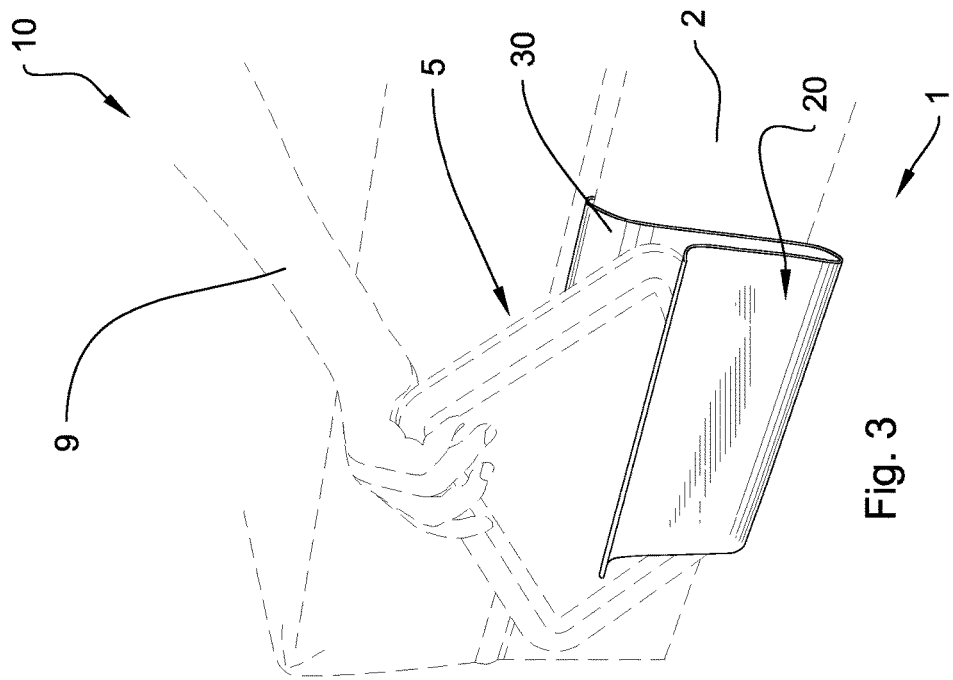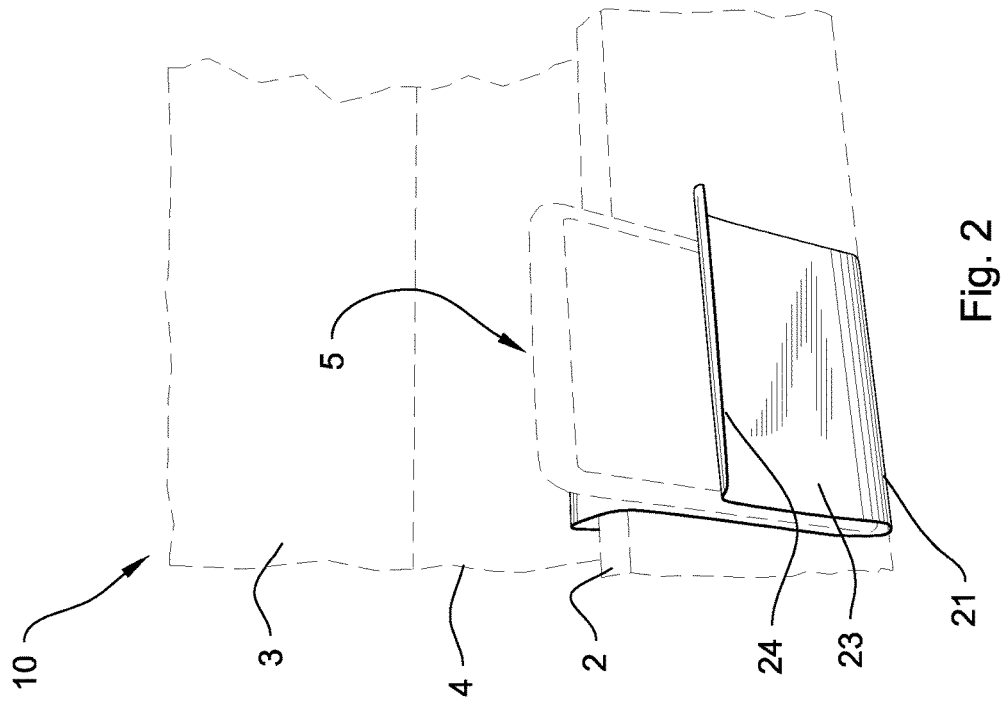

BEDSIDE MATTRESS ELECTRONICS CADDY

BACKGROUND OF THE INVENTION

1. Field of the Invention

This invention relates generally to apparatus for temporarily storing an object within convenient reach of a user, and particularly to such apparatus for storing such object at or near a bedside occupied by said user. More particularly, this invention relates to a caddy supported by a bed structure, the caddy having a resilient pocket within which a mobile electronic device may rest. Still more particularly, this invention relates to a bedside caddy with recharging capabilities for the mobile electronic device.

2. Description of Related Art

Mobile electronics devices are as ubiquitous and varied as they are convenient. Such devices include laptop computers, electronic tablets, mobile phones and hand-held gaming machines, to name a few. They typically are substantially rectangular in shape, largely planar, several inches wide and long and an inch or less in thickness.

Such devices have become so commonplace that in many circles they've taken the place of newspapers, televisions, books and writing tablets. As such, some users even take the devices to bed with them to read, write or provide entertainment. When not in use, they're typically laid onto a nearby night stand or directly onto the floor. Particularly laptops and larger tablet devices, however, occupy a large portion of the top of a night stand, in conflict with if not to the exclusion of other commonplace items such as eyeglasses, books and lamps. When placed onto the floor, such devices become vulnerable to being forgotten about and stepped on or kicked under the bed. A convenient pocket attachable to the bedside could hold such electronic devices securely, safely and conveniently at hand.

Several prior art devices provide similar function, but typically require features which compromise convenience. For example, most are composed of canvass, leather or cloth and rely upon a tongue extending between the bed's mattress and box spring. Relying largely upon friction between the tongue and mattress for support, such apparatus is prone to slip out from between the mattress and box spring under weight of the mobile device and from the force of inserting them into the apparatus, causing both to wind up on the floor. A need exists for a more stable bedside caddy.

Mobile devices also require periodic recharging of their internal batteries. Most commonly, a separate power supply plugs into a nearby electricity outlet and couples to the mobile device by a power lead. Each mobile device usually has a proprietary charger and coupling lead and plug seldom shared by other mobile devices. Further, power leads for conventional chargers sometimes lay loose when not in use, and if several mobile devices are to be charged in the same vicinity, the power leads may become tangled and confused. A need exists for a common charging means for all mobile electronic devices.

As it happens, this proliferation of power leads and chargers problem has been addressed with magnetic coupling. Each mobile device modified to contain within its chassis a magnetic coil coupler can intercept a nearby magnetic field and recharge itself by drawing energy from said magnetic field. A magnetic field generator positioned adjacent the mobile device chassis needs only one lead from a power supply plugged into a nearby electric outlet. Modifying the bedside caddy of the present invention to include such a magnetic field generator would render very convenient the charging of said mobile electronic devices while the user sleeps.

SUMMARY OF THE INVENTION

A bedside electronics caddy comprises a substantially vertical body, or trunk, juxtaposed to the side of the bed and coupled thereto a mounting head. Disposed on the vertical body opposite the bed, a resilient mandible extends upwardly from the bottom edge of the trunk to an outwardly curled lip, thereby forming an upwardly open pocket for holding an object such as a mobile electronic device. In one embodiment, the mounting head comprises a resilient hook which clamps onto the top of a bedside rail supporting the bed. In an alternate embodiment, the mounting head comprises a spur which inserts between the bed mattress and box spring, thereby cooperating with beds which have no side rails. In both alternate embodiments, an optional magnetic field generator mounted within the trunk may excite a charging coil within the chassis of the mobile electronic device for recharging the device.

BRIEF DESCRIPTION OF THE DRAWINGS

The novel features believed characteristic of the present invention may be set forth in appended claims. The invention itself, as well as a preferred mode of use and further objects and advantages thereof, will best be understood by reference to the following detailed description of an illustrative embodiment when read in conjunction with the accompanying drawings, wherein:

FIG. 1 shows a particular embodiment of the present invention in place on a bed rail.

FIGS. 2 and 3 show the embodiment of FIG. 1 in use on a bedside with various mobile electronic devices inserted into them.

FIGS. 4-5 show the embodiment of FIGS. 1-3 in side elevation views, with different mobile electronic devices in place within the pocket provided by the present invention.

DESCRIPTION OF A PREFERRED EMBODIMENT

Figure 6:
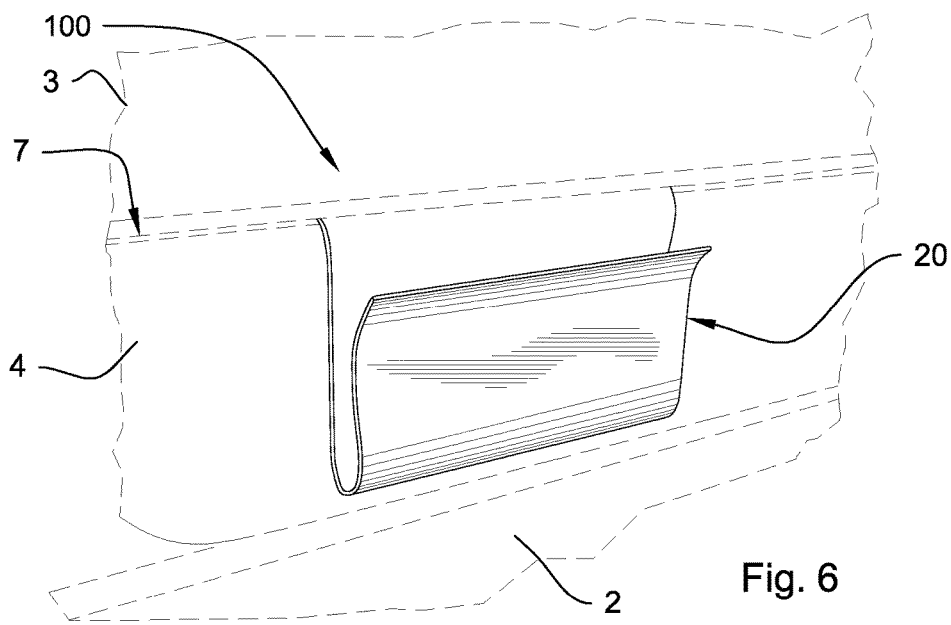
FIG. 6 shows an alternate embodiment of the present invention for use with beds which have no side rails.

Referring now to the figures, and particularly to FIGS. 1-5, a particular embodiment of the present invention comprises caddy 10 having a substantially "S" shaped body adapted to hook onto the top edge of side rail 2 of conventional, western style bed 1 having mattress 3 resting atop box spring 4. Rails 2 on either side of box spring 4 include an inner ledge (not shown) upon which the ends of transverse bed slats (not shown) rest to support box spring 4. Caddy 10 is designed to work with such beds having rails 2. Though shown with both in FIGS. 2-3, it is unimportant to this particular embodiment of the invention whether or not bed 1 includes both mattress 3 and box spring 4, as caddy 10 does not rely upon those components of the bed.

Caddy 10 further comprises central, substantially vertical trunk 11 adapted to rest juxtaposed rail 2 and to extend along rail 2 a spaced distance proportional to the size of mobile electronic devices 5, 6 it is designed to hold. Caddy 10 may vary in both horizontal length and vertical height to hold mobile electronic devices 5, 6 of various sizes, ranging from small cellular telephones approximately the size of a human hand to laptop computers larger than a dinner platter. One having ordinary skill in the art will recognize that all such sizes are considered to be within the spirit and scope of the present invention.

For supporting and grasping mobile electronic devices 5, 6, pocket 20 disposed on trunk 11 opposite rail 2 comprises an upwardly open mouth adapted to open to receive said devices 5, 6 within caddy 10. Pocket 20 also is open at both of its horizontal ends to permit insertion into pocket 20 of devices 5, 6 even if they are longer than the horizontal length of caddy 10. See FIGS. 2-3.

Pocket 20 further comprises cupped cradle 21 coupled to the bottom end of trunk 11 and extending away from rail 2 opposite bed 1. Cradle 21 forms a ledge beneath the bottom edge of devices 5, 6 and, in the case of larger electronic device 5 (FIGS. 2, 3), holds its weight. As depicted in the figures, cradle 21 preferably is continuous for the full, horizontal length of trunk 11. One having ordinary skill in the art will recognize, however, that cradle 21 could comprise other configurations, such as a plurality of elbow-like structures (not shown) spaced apart along and extending outwardly from the bottom edge of trunk 11, without departing from the spirit and scope of the present invention.

Disposed on the end of cradle 21 distal trunk 11, resilient mandible 23 extends upward from cradle 21 to terminate in outwardly curved lip 24 disposed a spaced distance below the top edge of trunk 11. Mandible 23 preferably converges slightly toward trunk 11 and is closest thereto at lip 24. Thus, trunk 11, cradle 21, mandible 23 and lip 24 form upwardly opening recess, or pocket, 20, into which mobile electronic devices 5, 6 may be inserted. Preferably, mandible 23 is resilient, and insertion of devices 5, 6 simply requires placing the lower edge of device 5, 6 against lip 24 and exerting downward pressure until said lower edge of device 5, 6 rests on cradle 21. If device 5, 6 is thick enough, it displaces mandible 23 away from trunk 11. Resilient mandible 23 then will clamp down upon device 5, 6, thereby securing it within pocket 20.

As depicted in the figures, mandible 23 comprises a single, substantially planar panel substantially the length of trunk 11 and only slightly shorter. One having ordinary skill in the art will recognize, however, that mandible 23 could comprise a plurality of individual arms (not shown) extending upwardly from cradle 21, either independently of each other or tied together by one or more cross members (not shown), including lip 24, without departing from the spirit and scope of the present invention. Mandible 23 alternately could comprise a mesh or grid of material covering substantially the same height and length as a solid sheet of material like that depicted in the figures, said grid forming and defining apertures extending through the thickness of mandible 23. Further, one having ordinary skill in the art will recognize that the outer surface of mandible 23, opposite recess 22, provides a convenient surface for decorations, logos or the like. See FIGS. 2-3.

As mentioned above, caddy 10 is supported on bed 1 by head 30 grasping the top edge of rail 2. Head 30 further comprises spar 31 extending substantially normal to trunk 11 from its proximate end coupled to the top edge of trunk 11 to its distal end disposed a select horizontal distance from trunk 11. Spar 31 thus lies in a substantially horizontal plane atop rail 2 when caddy 10 is installed properly thereon. Preferably, the horizontal length of spar 31 (normal to trunk 11 and lying atop rail 2) exceeds slightly the thickness of (typically approximately one (1") inch) of most conventional wooden bedside rails 2. One having ordinary skill in the art will recognize, however, that any length of spar 31 is considered to be within the spirit and scope of the present invention.

Depending downward from the end of spar 31 distal trunk 11, elongate finger 33 converges toward trunk 11 to terminate a spaced distance from trunk 11 that is shorter than the length of spar 31. Spar 31 and finger 33 thus form a hook-like structure extending substantially the horizontal length of trunk 11. Head 30, defined by spar 31 and finger 33 is adapted to grasp the top edge of rail 2, thereby supporting caddy 10 thereon, as well as the weight of anything held in pocket 20.

Preferably, spar 31 and finger 33 also are resilient, and the bottom edge of finger 33 is positioned close enough to trunk 11 to cause head 30 to grasp rail 2 firmly. This deters caddy 10 from inadvertently being slid along the horizontal length of rail 2 and from accidentally being kicked vertically upward and thereby knocked off of rail 2. As depicted in the figures, head 30 is continuous along the full horizontal wedth of trunk 11. One having ordinary skill in the art will recognize, however, that caddy 10 could be equipped with a plurality of horizontally shorter hooks spaced along the horizontal width of trunk 11 to form head 30, without departing from the spirit and scope of the present invention.

As best seen in FIGS. 1, 4-5, horizontally disposed, elastic band 15 may surround trunk 11 a spaced distance above cradle 21. Band 15 potentially serves at least two functions. First, preferably being fabricated from a rubber-like material, band 15 has a substantial coefficient of friction for engaging a polished surface of mobile device 5 and deterring any tendency of mobile device 5 to slide along cradle 21 and out one of the open ends of pocket 20. Second, being elastic and resilient, band 15 may be stretched to surround and hold a smaller mobile device 6 which is not thick enough to be engaged by lip 24. One having ordinary skill in the art also will recognize that band 15 may be positioned in a number of locations other than as depicted in the figures, including surrounding a horizontal portion of mandible 23 or cradle 21 instead of trunk 11, without departing from the spirit and scope of the present invention.

Figure 7:
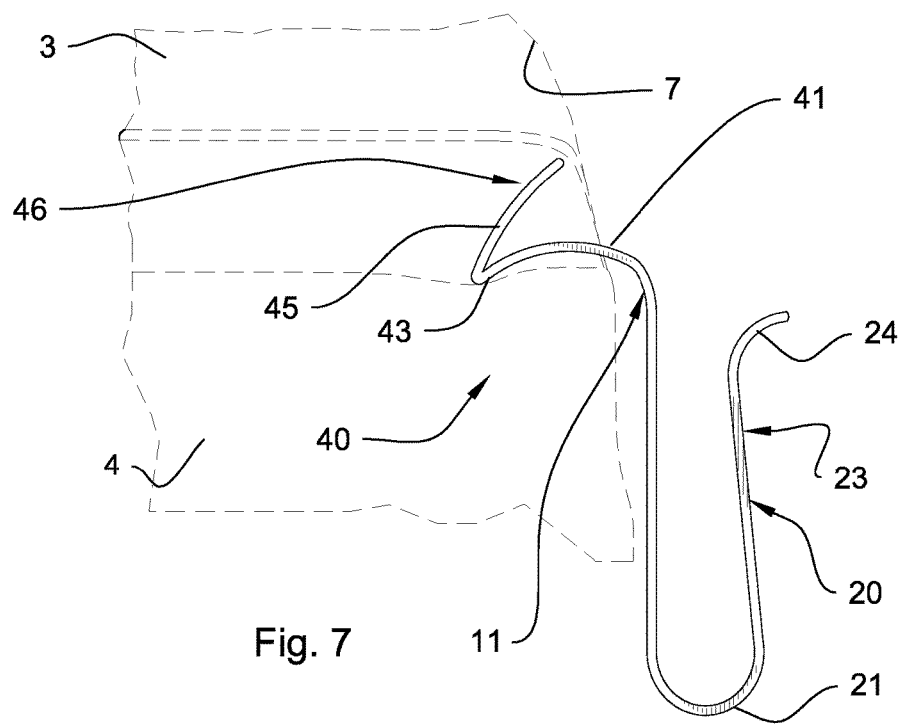
FIG. 7 details the bed attachment method used by the embodiment of FIG. 6.
Figure 8:
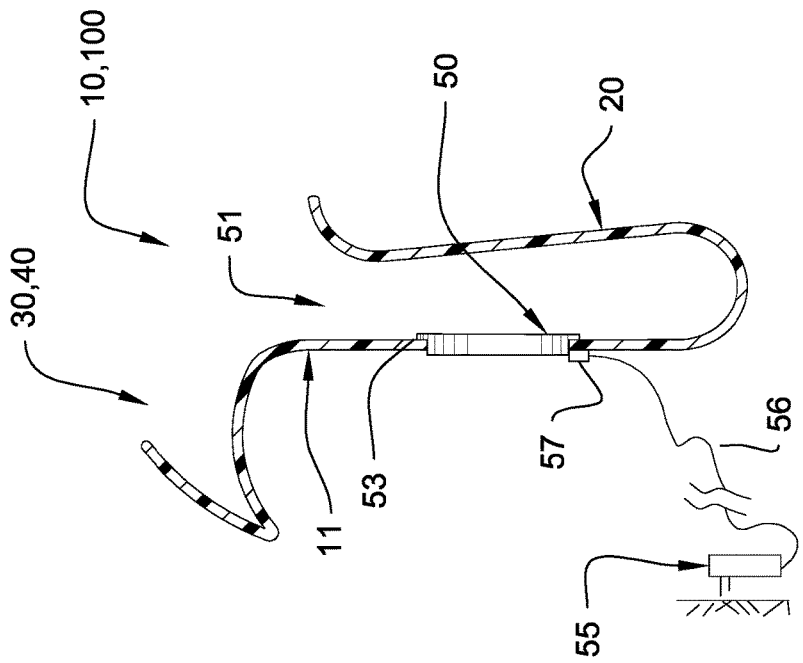

Turning now also to FIGS. 6-8, another particular embodiment of the present invention is adapted for use on beds 1 which do not include side rails 2, or under circumstances in which user 9 does not wish to support caddy 10 on rail 2. For example, some side rails 2, though provided on beds to support box spring 4 and/or mattress 3, are too thick for head 30 to span, thereby preventing caddy 10 from being supported thereon as described above. Other beds (not shown) simply do not include side rails 2, but instead support the bottom of box spring 4 using comparatively thin metal frames (not shown) which do not provide a place for caddy 10.

Caddy 100 of the particular embodiment depicted in FIGS. 6-8 is designed to work with such beds, and does not depend upon the bed frame at all for direct support. As best illustrated by FIGS. 6-7, caddy 100 has, in place of head 30, alternate head 40 adapted to engage mattress 3 and box spring 4 directly, and to lie adjacent the side of box spring 4 regardless of the type of frame supporting bed 1. For example, as depicted in FIGS. 6-7, caddy 100 may be used with bed 1 having side rails 2. One having ordinary skill in the art will recognize that any combination of bed 1, having rails 2 or not, may be used with the embodiment of caddy 100 without departing from the spirit and scope of the present invention.

As depicted, head 40 also includes alternate spar 41 coupled to and extending along the top edge of trunk 11 in the same manner as spar 31 of head 30. Spar 41 also extends substantially normal to trunk 11 from its proximate end adjacent trunk 11 to its opposite edge distal trunk 11. Instead, however, of having vertical finger 33 depending downward therefrom, spar 41 curves slightly downward at its distal edge to terminate in toe 43. Coupled to toe 43 and extending diagonally upward over the top of spar 41, barb 45 lies at an acute angle to spar 41 and extends from toe 43 to its barb edge 46 distal toe 43 (FIG. 8). Preferably, barb edge 46 is continuous for the length of caddy 100 and rounded slightly on each of its corners distal toe 43.

The foregoing geometry has the following effect. When spar 41 is inserted between mattress 3 and box spring 4, with trunk 11 depending downward and juxtaposed to box spring 4, the weight of mattress 3 bears down upon barb 45 to press toe 43 into the top surface of box spring 4, thereby creating a high-friction engagement of box spring 4 by caddy 100 along the length of toe 43. Further, barb edge 46 likewise engages the bottom surface of mattress 3 and creates a similar high-friction engagement of mattress 3 by caddy 100 along the length of barb edge 46. Still further, the weight of user 9 lying on mattress 3 increases both of these high-friction engagements to further increase the security of caddy 100 being held juxtaposed to the side of box spring 4.

Finally, conventional mattresses 3 typically include substantial seam 7 along at least their bottom edge adjacent box spring 4. Barb edge 46 is displaced above spar 41 such that it reaches and engages seam 7 along its horizontal length. By doing so, barb 45 embeds itself into the space between mattress 3 and box spring 4 such that caddy 100 cannot easily be pulled out without user 9 first lifting mattress 3 to relieve barb 45 of its weight. If this is done, caddy 100 easily may be removed from between mattress 3 and box spring 4 without causing harm to either. As long as the weight of mattress 3 lies upon barb 45, however, caddy 100 cannot be removed without considerable difficulty. Thus, the weight and downward thrust loading of pocket 20 cannot dislodge caddy 100 from bed 1. One having ordinary skill in the art will recognize, of course, that caddy 100 does not require the presence of seam 7 to function properly, as the weight of mattress 3 bearing down upon barb 45 presses toe 43 into box spring 4 sufficiently to hold caddy 100 in place.

Figure 9:
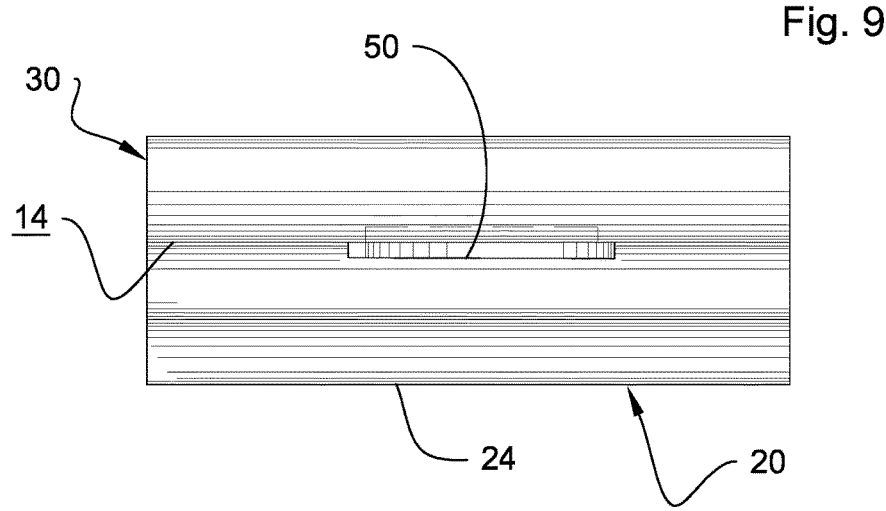
FIGS. 8-11 show the embodiments of FIGS. 1 and 7 further equipped with a magnetic field generator for recharging the mobile electronic device inserted within the pocket.
Figure 10:
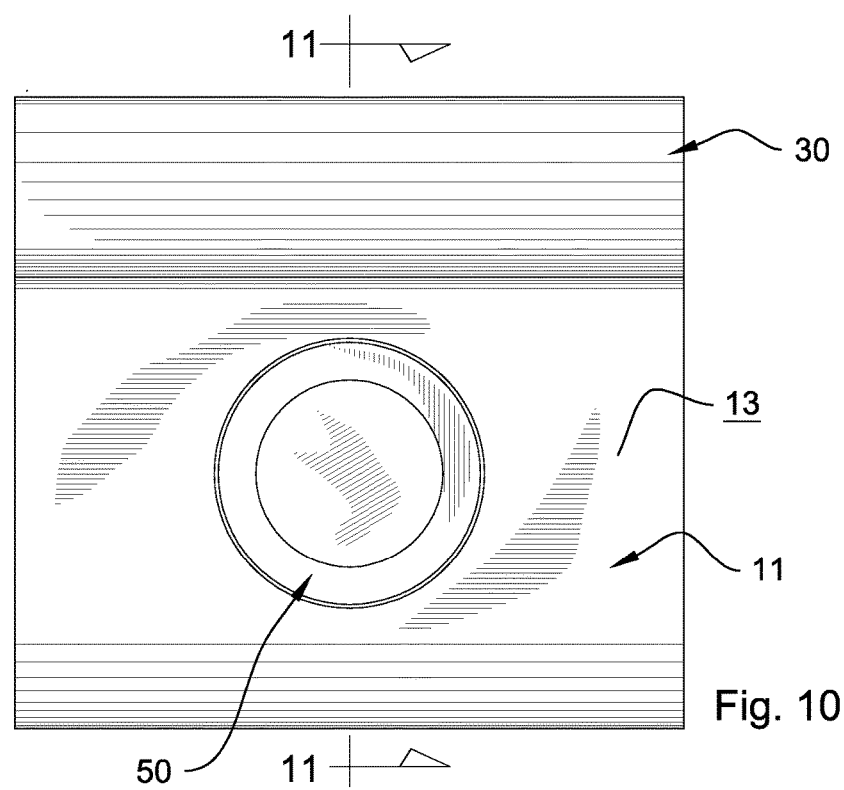
Figure 11:
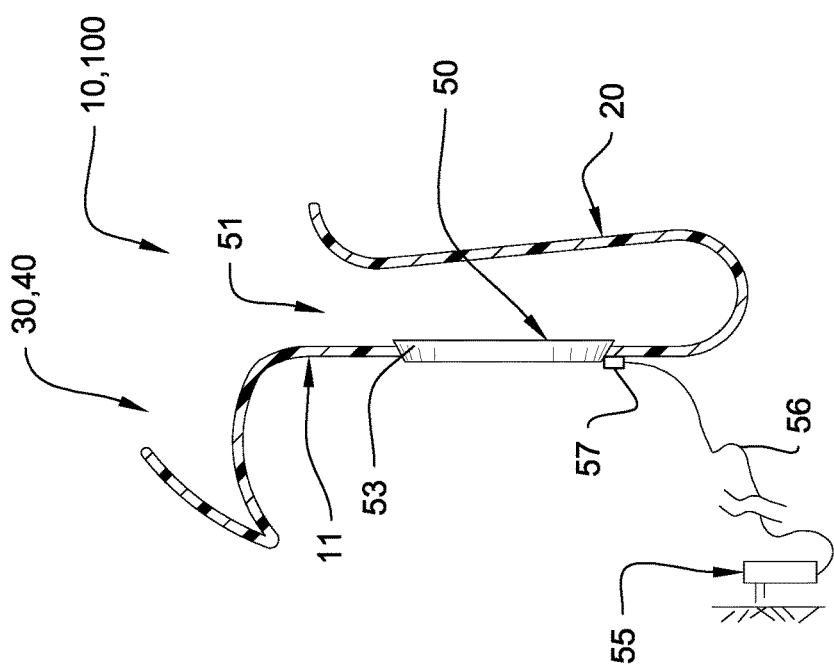

Turning now also to FIGS. 9-11, yet another particular embodiment of the present invention comprises either one or both of the previously discussed particular embodiments (caddies 10, 100 of FIGS. 1, 6 (respectively) equipped with magnetic charger 50. Disposed centrally within the expanse of trunk 11, charger 50 couples to power supply 55 through flexible lead 56 and connector 57 of conventional and proprietary means. Charger 50 as depicted is a substantially planar, ovate plate adapted to protrude through aperture 51 (FIG. 11) and to lie against a planar surface of mobile device 5, 6 within pocket 20. A magnetic field induced by charger 50 into receiver coils (not shown) included within mobile device 5, 6, provides energy from said power supply into the battery charging circuitry of mobile device 5, 6.

Charger 50 comprises a severely truncated conical shape such that it may be inserted only one way through aperture 51 to protrude into pocket 20 a short, fixed distance. Power lead 56 and connector 57 couple to charger 50 outside pocket 20. In its simplest form, charger 50 is held in place by friction engagement with aperture 51 and by the side of rail 2, but other means may be employed to hold charger 50 in place within aperture 51. For example, connector 57 may engage trunk 11 such that it holds charger 50 in place. Alternately, aperture 51 may be threaded with female threads matching male threads on the outer perimeter of charger 50 (neither shown) to secure charger 50 in place. Still alternately, clips or adhesive tape (neither shown) may engage charger 50 and hold it within aperture 51. One having ordinary skill in the art will recognize that all conventional attachment means for holding charger 50 within aperture 51 are considered to be within the spirit and scope of the present invention.

In operation, user 9 employing caddy 10 selects a convenient station along rail 2 of bed 1 and hooks caddy 10 over the top edge of rail 2 using head 30. User 9 then may adjust the location of caddy 10 by sliding it along rail 2 without removing it, but once user 9 releases head 30, caddy 10 will remain substantially in place because of the resilience of finger 33. When user 9 wishes to insert mobile device 5 into pocket 20 s/he holds device 5 by its upper edge (FIG. 3) and engages lip 24 with an opposite, lower edge of device 5. S/he then exerts downward pressure on device 5, causing mandible 23 to expand away from trunk 11 and to admit the lower edge of device 5 into pocket 20. User 9 continues to thrust device 5 into pocket 20 until it engages cradle 21 with its weight supported by caddy 10. Commonly, user 9 would rotate device 5 until its entire lower edge is supported by cradle 21, but one having ordinary skill in the art will recognize that this isn't necessary. If the particular mobile device 5, 6 used by user 9 comprises a cellular telephone or other small device 6, which is too thin to be held in place by mandible 23, then user 9 inserts device 6 beneath elastic band 15. To remove device 5, 6 from caddy 10, user 9 merely reverses the steps described in inserting it into pocket 20.

If device 5, 6 includes charging circuitry and caddy 10 includes charger 50, as discussed above, user 9 must be a bit more careful how device 5, 6 is placed within pocket 20. User 9 adjusts the horizontal displacement of device 5 relative to caddy 10 until charger 50 is centered on the location on device 5 where such charging circuitry is located. One having ordinary skill in the art will recognize that markings on lip 24 or head 30 could be included to assist user 9 in determining just where to insert device 5, 6 such that it properly aligns with charger 50.

To use caddy 100 instead of caddy 10, user 9 first lifts mattress 3 at a select location along box spring 4 where s/he wishes to locate caddy 100, and then inserts spar 41 between mattress 3 and box spring 4 until trunk 11 lies juxtaposed to the side of box spring 4. User 9 then lowers mattress 3 until its weight engages barb 45 to hold caddy 10 in place. Barb 45 flexes downward and presses toe 43 into the top of box spring 4, thus securing caddy 100 in place. To adjust the horizontal location of caddy 100 in this case, user 9 wouldn't just slide it as with caddy 10, but instead would lift mattress 3 again and relocate caddy 100. User 9 then proceeds to employ caddy 100 to support mobile device 5 as discussed above for caddy 10.

Preferably, caddies 10, 100 are fabricated from one of a class of amorphous thermoplastics suitably rigid and simultaneously resilient, such as rigid polyvinyl chloride (RPVC) or acrylonitrile butadiene styrene (ABS). Because of its lower gaseous emissions when burned, caddies 10, 100 more preferably are made from high-impact polystyrene (HIPS) available from Professional Plastics, Inc. of Fullerton, Calif., USA (www.professionalplastics.com).

Further, caddies 10, 100 lend themselves to being fabricated by an extrusion process and cut into segments corresponding to the desired width of caddies 10, 100. One having ordinary skill in the art will recognize, of course, that caddies 10, 100 also could be fabricated from an injection molding process, or by other processes such as component assembly, without departing from the spirit and scope of the present invention.

While the invention has been particularly shown and described with reference to preferred and alternate embodiments, it will be understood by those skilled in the art that various changes in form and detail may be made therein without departing from the spirit and scope of the invention. For example, caddies 10, 100 have been described in the context of holding mobile electronic devices 5, 6 within pocket 20, but they just as easily could hold a book, magazine, firearm, flashlight, folded newspaper or the like (none shown) to retain such object in a convenient location at user 9's bedside. Caddy 10 also has been described as mounting on bedside rail 2, but it also could mount elsewhere on bed 1 that provides a horizontal member for support. For example, if bed 1 includes a headboard (not shown) with a convenient location and a thickness such that it would fit within head 30, user 9 could place caddy 10 in such place. Caddy 10 also could mount on other furniture, whether or not it is kept near bed 1, and serve a similar purpose.

I claim:

1. A caddy adapted to support a substantially planar object on a bed, said bed having bed frame, said caddy comprising
    a caddy trunk extending substantially vertically between a caddy trunk top end and a caddy trunk bottom end;
    a caddy head coupled to said caddy trunk top end and extending substantially normal to said caddy trunk to couple to said bed;
    a resilient pocket coupled to said caddy trunk bottom end and extending away from said caddy trunk opposite said bed, said pocket opening upwardly alongside said caddy trunk, said resilient pocket having
        a cradle extending along said trunk bottom end, said cradle having a cradle proximate end coupled to said caddy trunk bottom end and a cradle distal end;
        at least one resilient mandible coupled to said cradle distal end and extending upward along said caddy trunk to terminate in a mandible lip disposed adjacent said caddy trunk top end;
    wherein said caddy trunk, said cradle and said at least one resilient mandible define an upwardly opening recess adapted to receive and support said planar object.

2. The caddy of claim 1 and further comprising
    friction means coupled within said resilient pocket and adapted to engage said planar object and to deter relative movement between said caddy and said planar object.

3. The caddy of claim 2 wherein the friction means comprises
    at least one elastic band extending substantially parallel to said caddy trunk top end.

4. The caddy of claim 1 wherein said bed frame further includes a bed rail having a bed rail thickness, an upper bed rail edge and a bed rail side, said caddy head further comprising
    a spar coupled by its proximate spar end to said caddy trunk and extending across said bed rail a spaced distance substantially equivalent to said bed rail thickness to its distal spar end; and
    a resilient finger coupled to and depending downward from said distal spar end to bear against said bed rail side below said bed rail edge;

wherein said caddy head grasps and is supported by said bed rail with said caddy juxtaposed to said bed rail.

5. The caddy of claim 1 wherein said bed further includes a bed box spring supporting a mattress, said box spring having a horizontal box spring upper surface and a vertical box spring side, said mattress having a mattress lower surface substantially coextensive with said box spring upper surface and a mattress side substantially coplanar with said box spring side, said caddy head further comprising
    at least one spar coupled by its proximate spar end to said caddy trunk and extending between said box spring upper surface and said mattress lower surface to distal spar end terminating in a spar toe adapted to bear against said upper box spring surface; and
    a barb coupled to said spar toe and extending diagonally upward therefrom above said spar to terminate in a barb edge adapted to bear against said lower mattress surface;

wherein said caddy head is sandwiched between said box spring and said mattress with said caddy trunk juxtaposed to said box spring side.

6. The caddy of claim 1 wherein
    said resilient mandible converges from said cradle distal end toward said caddy trunk top end; and
    said mandible lip curves away from said caddy trunk top end.

7. The caddy of claim 1 wherein said planar object comprises an electronic device having a magnetic charging coupler, and said caddy further comprises
    charging means coupled to said resilient pocket and adapted to magnetically couple to said magnetic charging coupler within said electronic device for recharging a battery within said electronic device.

8. The caddy of claim 7 wherein said charging means comprises
    a magnetic charger disposed within said caddy trunk between said caddy top end and said caddy bottom end and adapted to align with said magnetic charging coupler in said electronic device when said electronic device is disposed within said resilient pocket.

9. A bedside electronics caddy adapted to support an electronic device on a bed, said bed having bed frame, said electronics caddy comprising
    a caddy trunk extending substantially vertically between a caddy trunk top end and a caddy trunk bottom end;
    a caddy head extending from said caddy trunk top end and coupled to said bed;
    a pocket coupled to said caddy trunk bottom and having
        a cradle extending along said caddy trunk bottom end and away from said bed;
        at least one resilient mandible coupled to said cradle and extending upward along said caddy trunk to terminate adjacent said caddy trunk top end;
    wherein said caddy trunk, said cradle and said at least one resilient mandible define an upwardly opening recess adapted to removably receive and support said electronic device; and
    a magnetic charger disposed within said caddy trunk between said caddy top end and said caddy bottom end and adapted to align with a magnetic charging coupler disposed within said electronic device when said electronic device is disposed within said pocket.

10. The caddy of claim 9 wherein said bed further includes a box spring supporting a mattress, said box spring having an upper surface and a vertical box spring side, said mattress having a lower surface juxtaposed said box spring, said caddy head further comprising at least one spar coupled to said caddy trunk top end and extending between said upper surface and said lower surface
a spar toe disposed on said spar opposite said caddy trunk; and
a barb extending diagonally upward from said spar toe above said spar;
wherein said caddy head is sandwiched between said box spring and said mattress with said caddy trunk juxtaposed to said box spring side.

11. The caddy of claim 10 wherein
said spar is curved downward to cause said spar toe to frictionally engage said upper surface; and
said barb terminates distal said spar toe in a barb edge adapted to frictionally engage said lower surface;
whereby said spar toe and said barb edge resist removal of said caddy head from said bed when said mattress lies atop said box spring.

12. The caddy of claim 9 and further comprising
at least one elastic band extending substantially parallel to said caddy trunk top end and adapted to hold said electronic device against caddy trunk with said magnetic charging coupler juxtaposed to said magnetic charger.

13. The caddy of claim 9 wherein said bed frame further includes a bed horizontal member having a bed member upper edge and a bed member side, said caddy head further comprising
a spar extending from said caddy trunk across said bed member upper edge to a spar end; and
a finger depending from said distal spar end and adapted to bear against said bed member side;
whereby said caddy trunk is disposed juxtaposed said bed member.

14. A bedside electronics caddy adapted to support an electronic device on a bed, said bed having bed frame supporting a box spring and a mattress, said box spring having an upper surface and a vertical box spring side, said mattress having a lower surface juxtaposed said box spring, said electronics caddy comprising
a caddy trunk extending substantially vertically between a caddy trunk top end and a caddy trunk bottom end;
a caddy head extending from said caddy trunk top end and coupled to said bed, said caddy head further having
at least one spar coupled to said caddy trunk top end and extending between said upper surface and said lower surface
a spar toe disposed on said spar opposite said caddy trunk; and
a barb extending diagonally upward from said spar toe above said spar;
wherein said caddy head is sandwiched between said box spring and said mattress with said caddy trunk juxtaposed to said box spring side; and
a pocket coupled to said caddy trunk bottom and having
a cradle extending along said caddy trunk bottom end and away from said bed;
at least one resilient mandible coupled to said cradle and extending upward along said caddy trunk to terminate adjacent said caddy trunk top end;
wherein said caddy trunk, said cradle and said at least one resilient mandible define an upwardly opening recess adapted to removably receive and support said electronic device.

15. The caddy of claim 14 wherein
said spar is curved downward to cause said spar toe to frictionally engage said upper surface; and
said barb terminates distal said spar toe in a barb edge adapted to frictionally engage said lower surface;
whereby said spar toe and said barb edge resist removal of said caddy head from said bed when said mattress lies atop said box spring.

16. An improved method of supporting planar objects on furniture, said furniture having at least one horizontal member, said method comprising
providing a caddy adapted to be supported by said furniture, said caddy having
a caddy trunk extending substantially vertically between a caddy trunk top end and a caddy trunk bottom end;
a caddy head coupled to said caddy trunk top end and extending substantially normal to said caddy trunk to couple to said furniture;
a pocket coupled to said caddy trunk bottom end and opening upwardly alongside said caddy trunk to receive and support said planar object, said pocket further having
a cradle extending along said caddy trunk bottom end and away from said bed;
at least one resilient mandible coupled to said cradle and extending upward along said caddy trunk to terminate in a mandible lip disposed adjacent said caddy trunk top end; then
placing said caddy head atop one of said at least one horizontal member to cause said caddy to be supported by said at least one horizontal member; then
positioning said planar object between said mandible lip and said caddy trunk; then
pushing said planar object downward toward said cradle to cause said resilient mandible to open and admit said planar object into said pocket; then
continuing to lower said planar object within said pocket until it reaches a resting place upon said cradle.

17. The improved method of claim 16 wherein said planar object comprises an electronic device having a magnetic charging coupler, said method comprising the additional steps of
providing a magnetic charger disposed within said pocket; and
after said continuing step,
adjusting said electronic device resting place until said magnetic charging coupler is aligned with said magnetic charger; then
operating said magnetic charger to recharge said electronic device while it rests within said resting place.

18. The improved method of claim 17 and further comprising the steps of
providing at least one elastic band surrounding said caddy trunk between said caddy top end and said caddy trunk bottom end; and
as part of the adjusting step,
stretching said at least one elastic band and inserting said electronic device between said elastic band and said caddy trunk.

19. A caddy adapted to support a substantially planar object on a bed, said bed having bed frame supporting a box spring and a mattress, said box spring having a horizontal box spring upper surface and a vertical box spring side, said mattress having a mattress lower surface substantially coextensive with and disposed atop said box spring upper surface and a mattress side substantially coplanar with said box spring side, said caddy comprising
a caddy trunk extending substantially vertically between a caddy trunk top end and a caddy trunk bottom end;

a caddy head coupled to said caddy trunk top end and extending substantially normal to said caddy trunk to couple to said bed, said caddy head further having
  at least one spar coupled by its proximate spar end to said caddy trunk and extending between said box spring upper surface and said mattress lower surface to its distal spar end terminating in a spar toe adapted to bear against said upper box spring surface; and
  a barb coupled to said spar toe and extending diagonally upward therefrom above said spar to terminate in a barb edge adapted to bear against said lower mattress surface;
wherein said caddy head is sandwiched between said box spring and said mattress with said caddy trunk juxtaposed to said box spring side; and
  a resilient pocket coupled to said caddy trunk bottom end and extending away from said caddy trunk opposite said bed, said pocket opening upwardly alongside said caddy trunk to receive and support said planar object.

20. A caddy adapted to support an electronic device on a bed, said electronic device having a magnetic charging coupler, said bed having bed frame, said caddy comprising
  a caddy trunk extending substantially vertically between a caddy trunk top end and a caddy trunk bottom end;
  a caddy head coupled to said caddy trunk top end and extending substantially normal to said caddy trunk to couple to said bed;
  a resilient pocket coupled to said caddy trunk bottom end and extending away from said caddy trunk opposite said bed, said pocket opening upwardly alongside said caddy trunk to receive and support said planar object and
  charging means coupled to said resilient pocket and adapted to magnetically couple to said magnetic charging coupler within said electronic device for recharging a battery within said electronic device.

21. The caddy of claim 20 wherein said charging means comprises
  a magnetic charger disposed within said caddy trunk between said caddy top end and said caddy bottom end and adapted to align with said magnetic charging coupler in said electronic device when said electronic device is disposed within said resilient pocket.

* * * * *